United States Patent [19]
Brunner et al.

[11] 3,965,806
[45] June 29, 1976

[54] APPARATUS FOR BOILING, COOKING, STEAMING AND STERILIZING LIQUID, PORRIDGE-LIKE OR LUMPY FOOD

[75] Inventors: Manfred Brunner, Detmold-Bentrup; Horst Knochenhauer, Lage-Lippe, both of Germany

[73] Assignee: H. Wolff Apparatebau K.G., Lage-Lippe, Germany

[22] Filed: Feb. 5, 1975

[21] Appl. No.: 547,298

[30] Foreign Application Priority Data
Feb. 7, 1974 Germany............................ 2405807

[52] U.S. Cl................................ 99/331; 99/443 C
[51] Int. Cl.² .......................................... A47J 27/66
[58] Field of Search ............ 99/331, 352, 353, 355, 99/404, 407, 443; 426/407; 198/15, 75, 77, 82, 213

[56] References Cited
UNITED STATES PATENTS

| | | | |
|---|---|---|---|
| 1,544,304 | 6/1925 | Fenn | 426/407 |
| 2,406,395 | 8/1946 | Noel | 99/443 C X |
| 3,005,398 | 10/1961 | Sandler | 99/443 C |
| 3,181,955 | 5/1965 | Altman | 99/443 C X |
| 3,252,406 | 5/1966 | Altman | 99/443 C |
| 3,464,342 | 9/1969 | Kleinkauf | 99/443 C |

FOREIGN PATENTS OR APPLICATIONS

| | | | |
|---|---|---|---|
| 664,331 | 1/1952 | United Kingdom | 99/443 R |

Primary Examiner—Stanley N. Gilreath
Assistant Examiner—Arthur O. Henderson
Attorney, Agent, or Firm—Neil F. Markva

[57] ABSTRACT

Apparatus for boiling, cooking, steaming, simmering and sterilizing liquid, porridge-like or lumpy food, in which a material that is to be treated is fed into a cooker in the form of a cylindrical vessel. The vessel has entry and exit openings for the said material and a conveying screw in its interior. Feeding into the cooker is by means of a feed screw of which the rear end is sealed. The exit opening at the other end of the vessel communicates with a riser pipe surmounted by a decompression device in the form of a cyclone associated with a surface, trickle or injection condenser.

7 Claims, 1 Drawing Figure

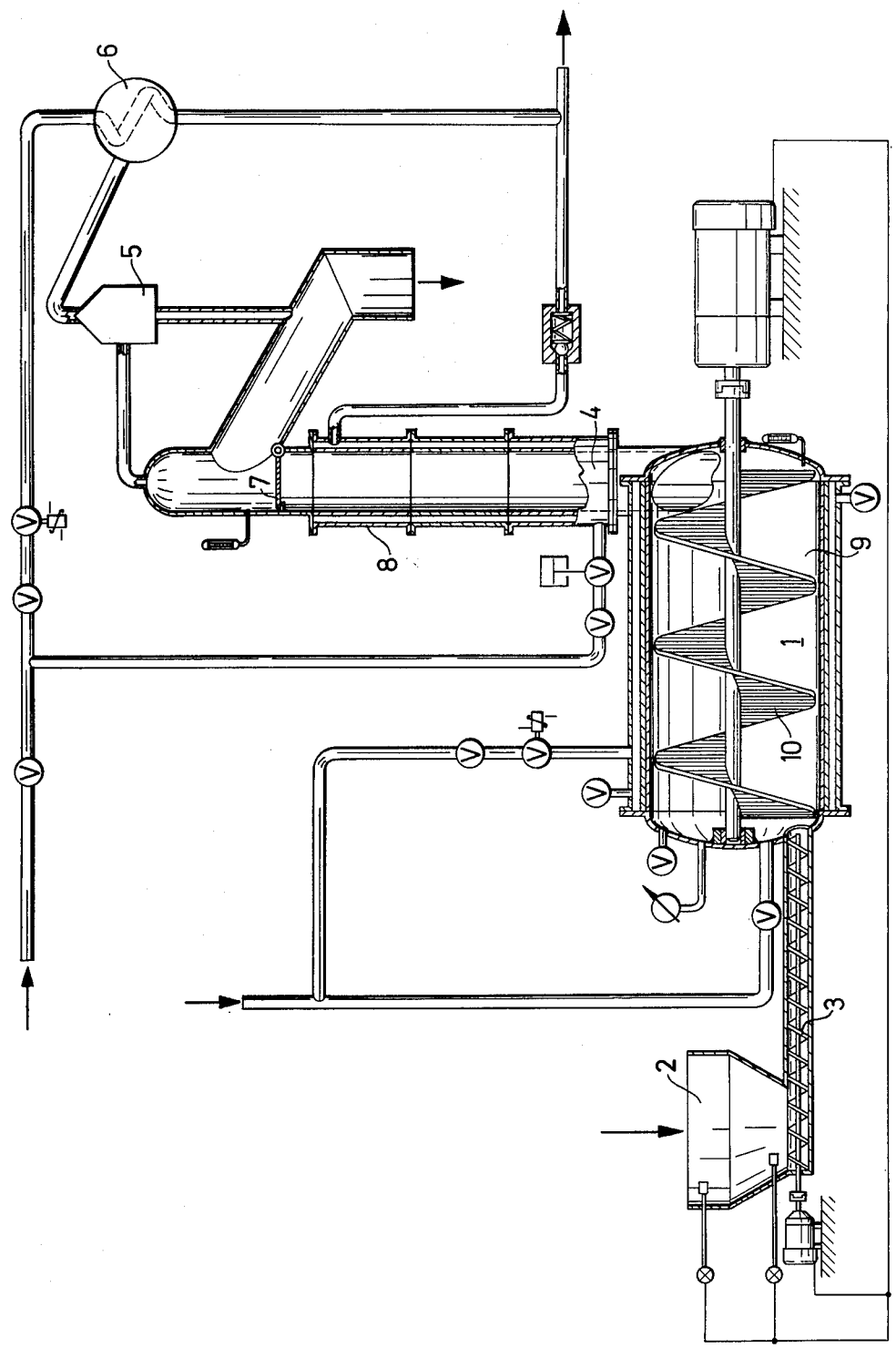

APPARATUS FOR BOILING, COOKING, STEAMING AND STERILIZING LIQUID, PORRIDGE-LIKE OR LUMPY FOOD

BACKGROUND OF THE INVENTION

This invention relates to apparatus for boiling, cooking, steaming, simmering and sterilizing liquid, porridge-like or lumpy feeds.

It is common knowledge that foodstuffs and other materials can be continuously steamed, cooked, simmered or boiled at atmospheric pressure.

It is also known to boil and thereby to sterilize foodstuffs by heating them in a water bath to temperatures above 100°C under gauge pressure. Boiling under pressure is a more rapid process for cooking than boiling at atmospheric pressure. Moreover, the higher pressure prevents water contained in the cooking material from being evaporated and the boiled food therefore remains more juicy and retains its flavor. The duration of the cooking is preferably so chosen that the material is sterilized. If the pressure is high enough to enable the temperature to be raised to 121°C or more without causing the water bath to boil, any germs in the liquid as well as spores will be destroyed. In this connection reference is made to U.S. Pat. No. 1,544,304.

The drawback of processes which permit continuous operation is that they are confined to boiling at atmospheric pressure. This diminishes the quality of the cooked material.

At the same time it is a drawback of known pressure cooking processes that they do not as such admit of continuous operation as they are batch processes. In view of this fact several such batch cookers must by alternately operated in parallel if continuity is to be maintained. Naturally this involves a higher capital cost.

SUMMARY OF THE INVENTION

In view of the defects of the state of the art the object of the present invention is the provision of apparatus for performing the same which will permit pressure cooking to be performed continuously.

According the present invention achieves this object by introducing a material that is to be treated into a cooker by feed means which are rearwardly sealed and discharging the treated material from the cooker through a riser pipe followed by a decompression device, the desired pressure in said cooker being adjusted by varying the height of said riser pipe and the temperature being steplessly controlled by varying the feed rate.

According to another feature of the invention the desired gauge pressure before the riser pipe is full is created by self-controlling devices and be an artificial pressure build-up in the riser pipe and in the cooker, and maintained when the last of the treated material has been discharged from the cooker by forcing in a blocking liquid or a compressed gas.

The feed rate into the cooker may be controlled by reference to the exit temperature of the material from the interior of said cooker into said riser pipe, said cooker being heated internally by steam or by external means.

The apparatus comprises a cooker in the form of a cylindrical vessel having entry and exit openings for material that is to be treated, and a conveying screw in its interior, the entry into said vessel being through a feed screw of which the rear end is sealed, whereas the exit opening at the other end of said vessel communicates with a riser pipe surmounted by a decompression device in the form of a cyclone associated with a surface, trickle or injection condenser.

The means which helps in building up the desired gauge pressure may be embodied in a self-regulating overpressure flap valve. Moreover, the charging hopper may preferably be equipped with control means for regulating the minimum rate of feed of the material that is to be treated.

Finally the riser pipe may be provided with a countercurrent cooling jacket for cooling the treated material at it ascends the riser pipe.

BRIEF DESCRIPTION OF THE DRAWING

In order that the invention may be more readily understood, and purely by way of example, an embodiment of the invention will now be described in greater detail, reference being made to the accompanying drawing which schematically shows apparatus according to the invention and one possible arrangement for controlling the same.

DESCRIPTION OF THE PREFERRED EMBODIMENT

In the drawing a pressure cooker 1 in the form of a cylindrical vessel is associated with a charging hopper 2 and a feed screw 3 for conveying a feed, such as a foodstuff, into the cooker 1. The charging hopper 2 is fitted with minimum feed rate control. The feed screw 3 could be replaced by some alternative feed means, such as a feed pump. In the illustrated embodiment the rear end of the feed screw 3 is sealed to permit pressure to build up in the interior 9 of the cooker 1.

A conveying screw 10 in the interior 9 of the cooker 1 conveys the boiling material at a controlled rate to a riser pipe 4 in which the ascending column of cooked material creates a pressure head. Until the column of cooked material reaches the top of the riser pipe 4 the desired pressure head is automatically maintained by a self-regulating overpressure flap valve 7 which causes the required artificial pressure in the riser pipe 4 and in the interior 9 of the cooker 1 to initially build up. As will be understood from the drawing the riser pipe 4 is contained in a countercurrent jacket 8. This jacket can be used for cooling or adjusting the temperature of the cooked material.

A decompression device 5 surmounts the riser pipe 4 in the form of a cyclone for separating particles of material that may have been upwardly entrained. The decompression device 5 is associated with a following surface, trickle or injection condenser 6 in which the vapors that have been evolved are condensed.

As already mentioned, the column of cooked material in the riser pipe 4 creates the pressure head. It will thus be understood that any pressure can be provided by changing the height of the riser pipe 4 permitting the boiling point in the interior 9 of the cooker 1 to be arbitrarily changed.

The temperature in the interior 9 of the cooker 1 can be infinitely varied by varying the feed rate of the material to be cooked. It should also be mentioned that the charging rate is controlled by reference to the exit temperature of the cooked material into the riser pipe 4 from the interior 9 of the cooker 1.

When the last of the cooked material has been discharged from the interior 9 of the cooker 1 the desired gauge pressure is maintained by a blocking liquid or by compressed gas which is subsequently forced in.

In the above-described apparatus all the mechanical feed means are adjustably controllable and the feed levels in the hoppers are maintained by limit switches.

The advantages over the state of the art reside in, that the gauge pressure and the feed rate can be controlled, that the cooked product can be cooled while still in the apparatus and that the overall arrangement is self-regulating.

The invention may be embodied in other specific forms without departing from the spirit or essential characteristics thereof. The embodiment is therefore to be considered in all respects as illustrative and not restrictive.

What we claim is:

1. Apparatus for boiling, cooking, steaming, simmering and sterilizing liquid, porridge-like or lumpy food, comprising a cooker in the form of a cylindrical vessel having entry and exit openings for a material that is to be treated, and a conveying screw in its interior, the entry into said vessel being through a feed screw of which the rear end is sealed, whereas the exit opening at the other end of said vessel communicates with a riser pipe surmounted by a decompression device in the form of a cyclone associated with a condenser.

2. Apparatus as defined in claim 1, wherein the condenser is a surface condenser.

3. Apparatus as defined in claim 1, wherein the condenser is a trickle condenser.

4. Apparatus as defined in claim 1, wherein the condenser is an injection condenser.

5. Apparatus as defined in claim 1, comprising means in the form of a self-regulating overpressure flap valve for building up the desired gauge pressure before said riser pipe is full of discharged material.

6. Apparatus as defined in claim 1, wherein a charging hopper is equipped with a minimum feed rate controller.

7. Apparatus as defined in claim 1, wherein said riser pipe is fitted with a countercurrent cooling jacket for controllably cooling the treated material.

* * * * *